Sept. 12, 1950  A. P. KRUEGER ET AL  2,522,047
TAPE-DISPENSING MACHINE
Filed April 18, 1947  2 Sheets-Sheet 1
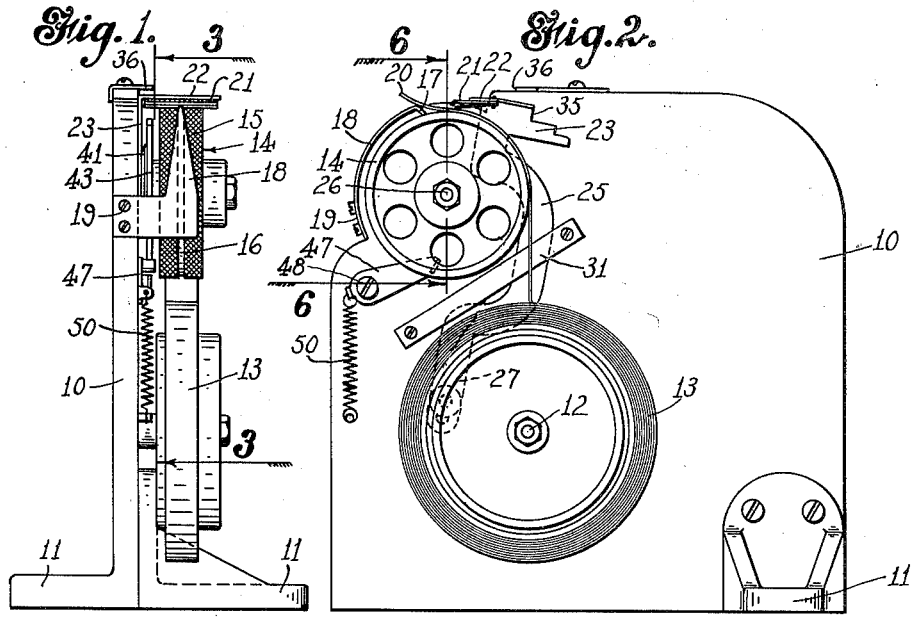
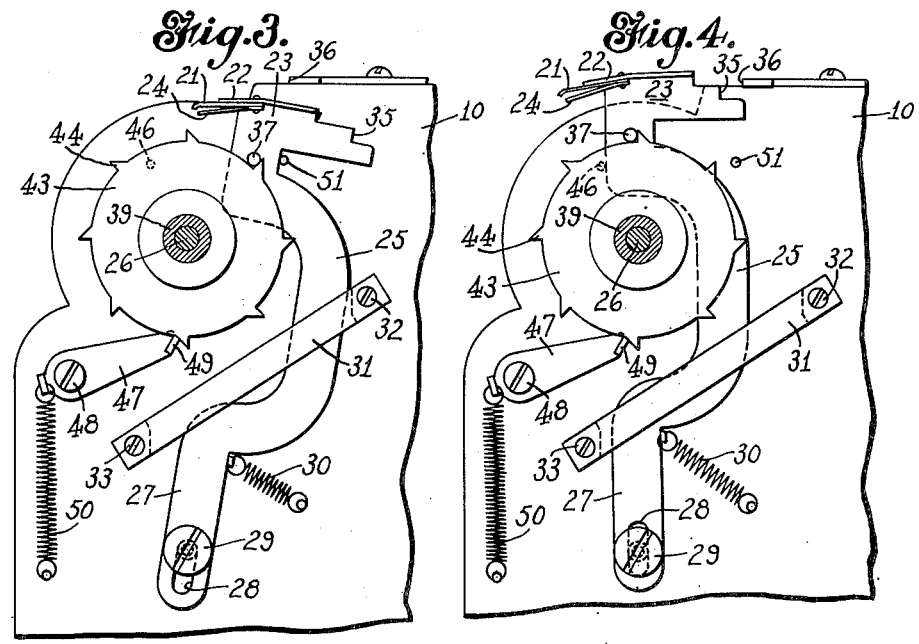
Inventor
Alfred P. Krueger
and Oscar P. Erhardt
By Rockwell & Barchtow
Attorneys Sept. 12, 1950     A. P. KRUEGER ET AL     2,522,047
TAPE-DISPENSING MACHINE Filed April 18, 1947     2 Sheets-Sheet 2

Patented Sept. 12, 1950

2,522,047

UNITED STATES PATENT OFFICE 2,522,047

TAPE-DISPENSING MACHINE

Alfred P. Krueger, Stratford, and Oscar P. Erhardt, Derby, Conn., assignors to Derby Sealers, Incorporated, Derby, Conn., a corporation of Connecticut Application April 18, 1947, Serial No. 742,300

15 Claims. (Cl. 164—84.5)

This invention relates to tape-dispensing machines, and more particularly to a machine for dispensing so-called "scotch" tape, which is tacky or clingable upon one surface.

Due to the fact that the tape will cling to any surface with which it comes in contact, the dispensing of such tape has presented certain problems which must be overcome. Some devices for holding and dispensing the tape are so constructed that the operator grasps the tape and draws it from the supply roll by a pull on the free end of the tape. With such machines, it is, of course, desirable that the end of the part of the tape remaining on the supply roll project freely, so that it can be readily engaged by the finger or fingers of the operator and drawn from the roll.

Also, some means must be provided which enables the dispensed portion of the tape to be severed, so that a proper length will be ready for use. When a piece has been severed, the end of the supply portion will normally lie adjacent the severing member so that it is difficult for the operator to get hold of the end in order to draw off a succeeding length.

In the present invention, a dispensing machine is provided having a feed drum with which the tape is engaged and over which the tape is trained when drawn from the roll. Adjacent this feed drum is mounted a severing member in the form of a cutter or blade against which the tape may be severed by the operator, and this severing blade is so arranged that it will have a to-and-fro movement whereby it may be drawn forwardly as the tape is drawn forwardly but will recede or move rearwardly after the severing operation takes place, so that, at the completion of the operation, the end of the tape will be in a position forward of the severing member, whereby it may be readily grasped.

In addition, means are provided to insure that the tape does not cling to the severing member so as to be carried rearwardly with it, and also stripping means are provided to insure that the tape is stripped from the feed drum, so that the end of the tape will project freely from the adjacent parts of the mechanism, thus presenting a free end which may be readily engaged by the fingers of the operator.

One object of the present invention is to provide a new and improved machine for dispensing scotch tape.

A further object of the invention is to provide a machine by which the tape may be dispensed by a direct pull of the operator on the end of the tape, and which will be so constructed that the end of the tape upon the supply roll will always project freely from the machine where it may be readily engaged by the finger or fingers of the operator.

A still further object of the invention is to provide a tape-dispensing machine of the character described whereby the severing member or tear-off blade will be movably mounted with respect to the feed mechanism, so that the severing blade will move forwardly and rearwardly to be in a position at one time to sever the tape at the proper point and to be in a position at another time to expose a free end of the tape.

Still another object of the invention is to provide a tape-dispensing machine of the character described having a feed drum and a severing member mounted to move relatively to the feed drum, and stripping means arranged to strip the tape from the severing member and also from the drum, so that a free end of the tape will be presented to the operator.

To these and other ends the invention consists in the novel features and combinations of parts to be hereinafter described and claimed.

In the accompanying drawings:

Fig. 1 is a front elevational view of a tape-dispensing machine embodying our invention;

Fig. 2 is a side elevational view thereof;

Fig. 3 is an enlarged partial sectional view on line 3—3 of Fig. 1;

Fig. 4 is a view similar to Fig. 3, but showing the parts in another position;

Figure 5:
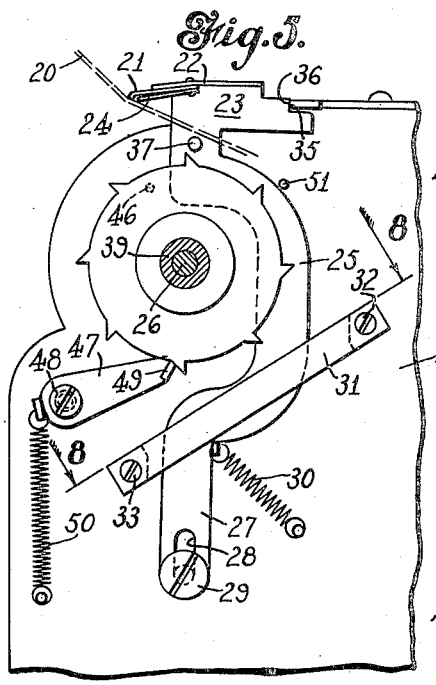
Fig. 5 is a view similar to Fig. 3, but showing the parts in the position they occupy when the tape is being severed.

To illustrate a preferred embodiment of our invention, we have shown a standard or frame member 10 which may be supported from a suitable surface by the feet or flanges 11. Upon the frame member 10 is mounted a spindle 12 upon which the supply roll of tape 13 may be rotatably mounted.

Also rotatably mounted upon the standard 10 above the supply roll of tape is a feed drum 14. This drum, as shown in Fig. 1, is provided with a knurled peripheral surface 15 and with an annular groove or slot 16 within which extends the stripper finger 17 of a stripper member 18 secured to the frame at 19. As shown in Fig. 2, the free end 20 of the tape, as it comes from the supply roll 13, is trained about the drum 14 with its clingable or tacky surface in engagement with the knurled periphery of the drum to which the tape clings, and the stripper finger 17 will hold the free end of the tape away from the drum, so that the latter will not cling thereto but will project freely therefrom to be engaged by the operator.

A severing member in the form of a tear-off blade 21 is secured to a horizontally extending flange 22, this flange being formed upon a knife-carrying shank member 23. Below the severing member 21 is a stripper member 24 of resilient material, which member at its free forward end tends to stand in spaced position with relation to the severing member 21, so that, after the tape has been severed, as shown in Fig. 5, the member 24 will spring away from the member 21 due to its resilience, and thus prevent the tape clinging to the former member.

Figure 8:
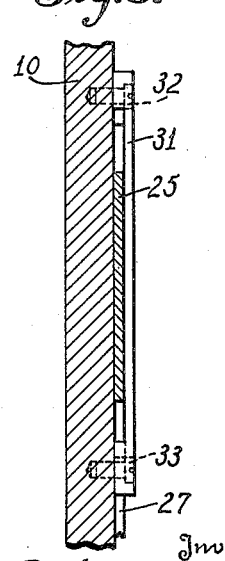
Fig. 8 is a sectional view on line 8—8 of Fig. 5.

The shank member 23 is provided with a U-shaped portion 25 to extend around the shaft 26 of the feed drum 14, and is also provided with a lower end portion 27 having an elongated slot 28 therein, in which slot is received a pin or screw 29 secured to the standard 10. It will be apparent that with this construction the knife-carrying member 23 and the knife or severing member 21 is mounted on the frame member 10 for pivotal movements about the pin 29 and also for vertical movement with respect to the frame member as permitted by the slot 28. A spring 30 secured at one end to the plate 10 and at the other to the upper portion of the part 27 of the knife carrier tends to urge the latter downwardly and rearwardly or in a clockwise direction, as viewed in Figs. 2, 3, and 4. In order to guide this knife carrier in its movements, a guide strip 31 is secured adjacent its ends to the frame member 10, as shown at 32 and 33, the body portion of this strip being spaced from the frame member, as shown in Fig. 8, so that the U-shaped portion of the carrier 23 may lie between this strip and the frame member 10.

At its upper end, the knife carrier 23 is provided with a shoulder 35 which, in the position of the parts occupied when the tape is being severed, as shown in Fig. 5, is adapted to be lodged against a stop 36 secured to the frame member 10 so that the severing member will be held firmly against rearward movement during the severing operation. The carrier 23 is also provided with a laterally projecting pin 37, the purpose of which will be hereinafter described.

Figure 6:
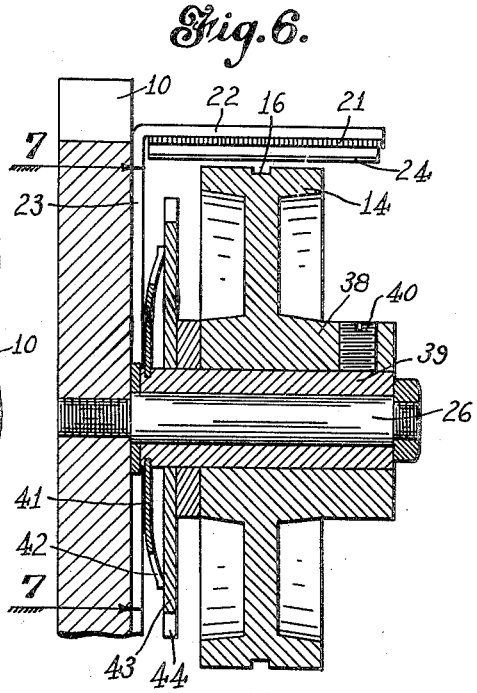
Fig. 6 is a sectional view on line 6—6 of Fig. 2.
Figure 7:
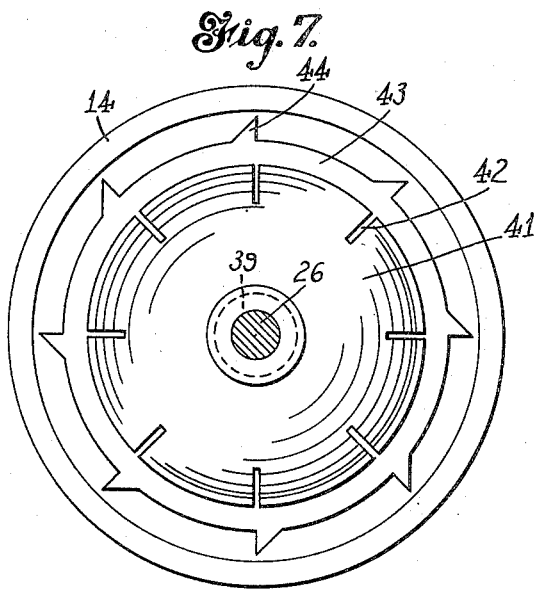
Fig. 7 is a sectional view on line 7—7 of Fig. 6.

As shown more especially in Fig. 6, the feed drum 14 is provided with a hub 38 secured to a sleeve 39 by the set screw 40, this sleeve being rotatably mounted on the shaft 26. Also secured to the sleeve 39 is a spring washer 41, this washer being in the form of a cupped disk having radial slots 42 at spaced intervals in its periphery. The periphery of this washer bears against a ratchet disk 43 having teeth 44 thereon. This disk is loosely mounted upon the sleeve 39, but the pressure of the washer 41 frictionally secures it to the feed drum with the result that, unless one of these parts is restrained from movement, the two will rotate together. As shown in Fig. 3, the teeth 44 on the ratchet disk 43 are adapted to engage the pin 37 on the knife carrier 23 and move this carrier and the severing member or knife 21 in a forward direction. A stop pin 46 is provided on the frame adapted to engage the forward edge of the carrier 23 when the parts are in the position shown in Fig. 4 to limit the forward movement of the knife carrier, and, thereafter, the feed drum will rotate in a forward direction independently of the ratchet disk 43 as permitted by the cupped washer 41.

A holding pawl 47 is pivoted at 48 on the frame member 10, the free end 49 of this member being held in engagement with the teeth of the ratchet disk 43 by a spring 50 secured at one end to the frame member 10 and at the other end to the holding pawl. This holding pawl will permit rotation of the ratchet disk in a forward or counter-clockwise direction, as shown in Figs. 3 and 4, but will prevent reverse rotation of the disk, and, thus due to the friction connection between the disk and the feed drum 14, will prevent rotation of the feed drum in a reverse or non-feeding direction.

Normally the parts of the mechanism will stand in the position shown in Fig. 2, wherein the end 20 of the tape upon the supply roll will be disposed forwardly of the knife or severing member 21 and will be prevented from contact with the periphery of the feed drum 14 by the stripper finger 17, so that it may be readily grasped by the operator. When the free end of the tape is drawn forwardly by the operator, the feed drum will be rotated in a counterclockwise direction, as shown in Fig. 2, thus drawing the tape from the roll, the tape which is dispensed extending forwardly from the feed drum over the stripper finger 17. The knife carrier 23 and ratchet disk 43 are initially in the position shown in Fig. 3. When the drum 14 rotates, it will, through frictional engagement of the disk 43 therewith, effect rotation of this disk, and the pin 37 upon the knife carrier will be engaged by one of the teeth 44, carrying the latter member to the position shown in Fig. 4 in which the severing member 21 has moved forwardly with respect to the axis of the feed drum and has moved at substantially the same rate of travel as the periphery of the drum.

At this time, it will be noted that the front edge of the carrier member 23 has engaged the stop pin 46, so that further movement of the carrier member will be prevented. The feed drum, however, may continue its movement until a sufficient length of tape has been dispensed, this relative movement of the drum 14 and the disk 43 being permitted by the frictional engagement between these two members. Also, at this time the holding pawl 47 will be in engagement with another of the teeth 44 upon the disk 43 which will prevent reverse movement of the disk.

When a sufficient length of tape has been drawn from the supply roll, the operator moves the free end of the tape sharply upward against the tear-off member 21, as shown in Fig. 5. Pressure of the tape upwardly against the tear-off member raises the carrier 23, and thus disengages the pin 37 from the tooth 44 of the ratchet disk with which it has been engaged. When the pin 37 has been disengaged from the tooth, the spring 30 draws the carrier member 23 rearwardly about the pin 29, so that the shoulder 35 strikes against the stop 36 and thus the carrier is held against further rearward movement during the severing of the tape. It will be understood that upward pressure of the tape upon the tear-off blade 21 holds the carrier member 23 in raised position at this time, so as to maintain the shoulder 35 in engagement with the stop 36.

As soon, however, as the tape has been severed, there is no longer any upward pressure upon the tear-off blade, and the spring 30 draws the carrier member 23 downwardly to disengage the shoulder 35 from the stop 36 and thereupon draws the carrier member rearwardly about the pivot pin 29 until it strikes the stop 51, as shown in Fig. 3, thus restoring the parts to the position assumed at the start of an operation.

At the time the tape is torn off against the member 21, the end of the tape will be substantially flush with the forward edge of the tear-off blade. It will be stripped from the blade by the stripper 24 and will, of course, stand in a position spaced from the feed drum on account of the stripper finger 17. Therefore, when the spring 30 moves the carrier 23 and tear-off blade 21 rearwardly from the position shown in Fig. 5 to that shown in Fig. 3, the tear-off blade will be moved relatively to the tape engaged with the feed drum 14 which remains at rest at this time, and thus the free end of the tape will be exposed, as shown in Fig. 2, for example, so that it may be readily engaged by the fingers of the operator for a subsequent operation.

While we have shown and described a preferred embodiment of our invention, it will be understood that it is not to be limited to all of the details shown, but is capable of modification and variation within the spirit of the invention and within the scope of the claims.

What we claim is:

1. A tape-dispensing mechanism comprising a frame, a feed drum rotatably mounted on the frame, a severing member adjacent the feed drum against which the tape may be torn off, means mounting the severing member on the frame for movement relatively to the axis of the feed drum, and means connecting said feed drum with said severing member to move the latter forwardly with respect to the movement of the tape upon rotation of the drum in a feeding direction.

2. A tape-dispensing mechanism comprising a frame, a feed drum rotatably mounted on the frame, a severing member adjacent the feed drum against which the tape may be torn off, means mounting the severing member on the frame for movement relatively to the axis of the feed drum, means connecting said feed drum with said severing member to move the latter forwardly with respect to the movement of the tape upon rotation of the drum in a feeding direction, and means to restrain said severing member against movement in a reverse direction during the severing operation.

3. A tape-dispensing mechanism comprising a frame, a feed drum rotatably mounted on the frame, a severing member adjacent the feed drum against which the tape may be torn off, a supporting element for the severing member, means mounting said element on the frame for movement toward and from the axis of the feed drum, and means connecting said feed drum with said element to move the latter forwardly with respect to the drum axis when the drum is rotated.

4. A tape-dispensing mechanism comprising a frame, a feed drum rotatably mounted on the frame, a severing member adjacent the feed drum against which the tape may be torn off, a supporting element for the severing member, means mounting said element on the frame for movement toward and from the axis of the feed drum, means connecting said feed drum with said element to move the latter forwardly with respect to the drum axis when the drum is rotated, and spring means adapted to move it in the opposite direction.

5. A tape-dispensing mechanism comprising a frame, a feed drum rotatably mounted on the frame, a severing member adjacent the feed drum against which the tape may be torn off, a supporting element for the severing member, means mounting said element on the frame for movement toward and from the axis of the feed drum, and means connecting said feed drum with said element to move the latter forwardly with respect to the drum axis when the drum is rotated, said last-named means including a member frictionally connected to the drum to be rotated thereby.

6. A tape-dispensing mechanism comprising a frame, a feed drum rotatably mounted on the frame, a severing member adjacent the feed drum against which the tape may be torn off, a supporting element for the severing member, means mounting said element on the frame for movement toward and from the axis of the feed drum, means connecting said feed drum with said element to move the latter forwardly with respect to the drum axis when the drum is rotated, said last-named means including a member frictionally connected to the drum to be rotated thereby, and means to engage and limit movement of said element in said direction whereby, due to said frictional connection, it remains stationary while permitting rotation of the drum after such engagement.

7. A tape-dispensing mechanism comprising a frame, a feed drum rotatably mounted on the frame, a severing member adjacent the feed drum against which the tape may be torn off, means mounting said severing member on the frame for pivotal movement relatively to the axis of the drum and for movement in a substantially vertical direction, and means connecting said feed drum to said member to move the latter in a forward direction relatively to the movement of the tape upon rotation of the drum.

8. A tape-dispensing mechanism comprising a frame, a feed drum rotatably mounted on the frame on a substantially horizontal axis, a severing member mounted above the feed drum against which the tape may be torn off, means mounting said severing member on the frame for pivotal movement relatively to the axis of the drum and for movement in a substantially vertical direction, means connecting said feed drum to said member to move the latter in a forward direction relatively to the movement of the tape upon rotation of the drum, and said member being moved upwardly with respect to the axis of the drum by engagement of the tape therewith to sever the latter.

9. A tape-dispensing mechanism comprising a frame, a feed drum rotatably mounted on the frame on a substantially horizontal axis, a severing member mounted above the feed drum against which the tape may be torn off, means mounting said severing member on the frame for pivotal movement relatively to the axis of the drum and for movement in a substantially vertical direction, means connecting said feed drum to said member to move the latter in a forward direction relatively to the movement of the tape upon rotation of the drum, said member being moved upwardly with respect to the axis of the drum by engagement of the tape therewith to sever the latter, and a stop to prevent rearward movement of the severing means during the severing operation.

10. A tape-dispensing mechanism comprising a frame, a feed drum rotatably mounted on the frame on a substantially horizontal axis, a severing member mounted above the feed drum against which the tape may be torn off, means mounting said severing member on the frame for pivotal movement relatively to the axis of the drum and for movement in a substantially vertical direction, said means including a shank on which said member is carried, an element connected to said feed drum and engaging said shank to move it in a forward direction relatively to the movement of the tape on the drum upon rotation of the drum, and said shank being moved upwardly with respect to the axis of the drum and disengaged from said element by engagement of the tape with the severing member to sever the tape.

11. A tape-dispensing mechanism comprising a frame, a feed drum rotatably mounted on the frame on a substantially horizontal axis, a severing member mounted above the feed drum against which the tape may be torn off, means mounting said severing member on the frame for pivotal movement relatively to the axis of the drum and for movement in a substantially vertical direction, said means including a shank on which said member is carried, an element connected to said feed drum and engaging said shank to move it in a forward direction relatively to the movement of the tape on the drum upon rotation of the drum, said shank being moved upwardly with respect to the axis of the drum and disengaged from said element by engagement of the tape with the severing member to sever the tape, a spring urging said shank rearwardly and downwardly, and a stop to prevent rearward movement of the severing member during the severing operation.

12. A tape-dispensing mechanism comprising a frame, a feed drum rotatably mounted on the frame on a substantially horizontal axis, a severing member mounted above the feed drum against which the tape may be torn off, means mounting said severing member on the frame for pivotal movement relatively to the axis of the drum and for movement in a substantially vertical direction, said means including a shank on which said member is carried, an element connected to said feed drum and engaging said shank to move it in a forward direction relatively to the movement of the tape on the drum upon rotation of the drum, said shank being moved upwardly with respect to the axis of the drum and disengaged from said element by engagement of the tape with the severing member to sever the tape, and said element being frictionally connected to the drum whereby the latter may move independently thereof.

13. A tape-dispensing mehanism comprising a frame, a feed drum rotatably mounted on the frame on a substantially horizontal axis, a severing member mounted above the feed drum against which the tape may be torn off, means mounting said severing member on the frame for pivotal movement relatively to the axis of the drum and for movement in a substantially vertical direction, said means including a shank on which said member is carried, an element connected to said feed drum and engaging said shank to move it in a forward direction relatively to the movement of the tape on the drum upon rotation of the drum, said shank being moved upwardly with respect to the axis of the drum and disengaged from said element by engagement of the tape with the severing member to sever the tape, said element being frictionally connected to the drum whereby the latter may move independently thereof, and a stop limiting forward movement of the severing member.

14. A tape-dispensing mechanism comprising a frame, a feed drum rotatably mounted on the frame on a substantially horizontal axis, a severing member mounted above the feed drum against which the tape may be torn off, means mounting said severing member on the frame for pivotal movement relatively to the axis of the drum and for movement in a substantially vertical direction, said means including a shank on which said member is carried, an element connected to said feed drum and engaging said shank to move it in a forward direction relatively to the movement of the tape on the drum upon rotation of the drum, said shank being moved upwardly with respect to the axis of the drum and disengaged from said element by engagement of the tape with the severing member to sever the tape, said element comprising a toothed disk frictionally secured to said drum, and said shank having a pin thereon adapted to be engaged by a tooth on the disk.

15. A tape-dispensing mechanism comprising a frame, a feed drum rotatably mounted on the frame on a substantially horizontal axis, a severing member mounted above the feed drum against which the tape may be torn off, means mounting said severing member on the frame for pivotal movement relatively to the axis of the drum and for movement in a substantially vertical direction, said means including a shank on which said member is carried, an element connected to said feed drum and engaging said shank to move it in a forward direction relatively to the movement of the tape on the drum upon rotation of the drum, said shank being moved upwardly with respect to the axis of the drum and disengaged from said element by engagement of the tape with the severing member to sever the tape, said element comprising a toothed disk frictionally secured to said drum, said shank having a pin thereon adapted to be engaged by a tooth on the disk, and a pawl engaging said disk to prevent reverse rotation thereof.

ALFRED P. KRUEGER.
OSCAR P. ERHARDT.

REFERENCES CITED

The following references are of record in the file of this patent:

UNITED STATES PATENTS

| Number | Name | Date |
|---|---|---|
| 2,272,628 | Anderson | Feb. 10, 1942 |
| 2,366,971 | Krueger | Jan. 9, 1945 |
| 2,456,625 | Cullin | Dec. 21, 1948 |
| 2,466,715 | Krueger | Apr. 12, 1949 |